Aug. 21, 1962 — T. J. MOORE — 3,049,955
MACHINE FOR SHEARING FLANGES FROM I-BEAMS
Filed Aug. 27, 1959 — 3 Sheets-Sheet 1
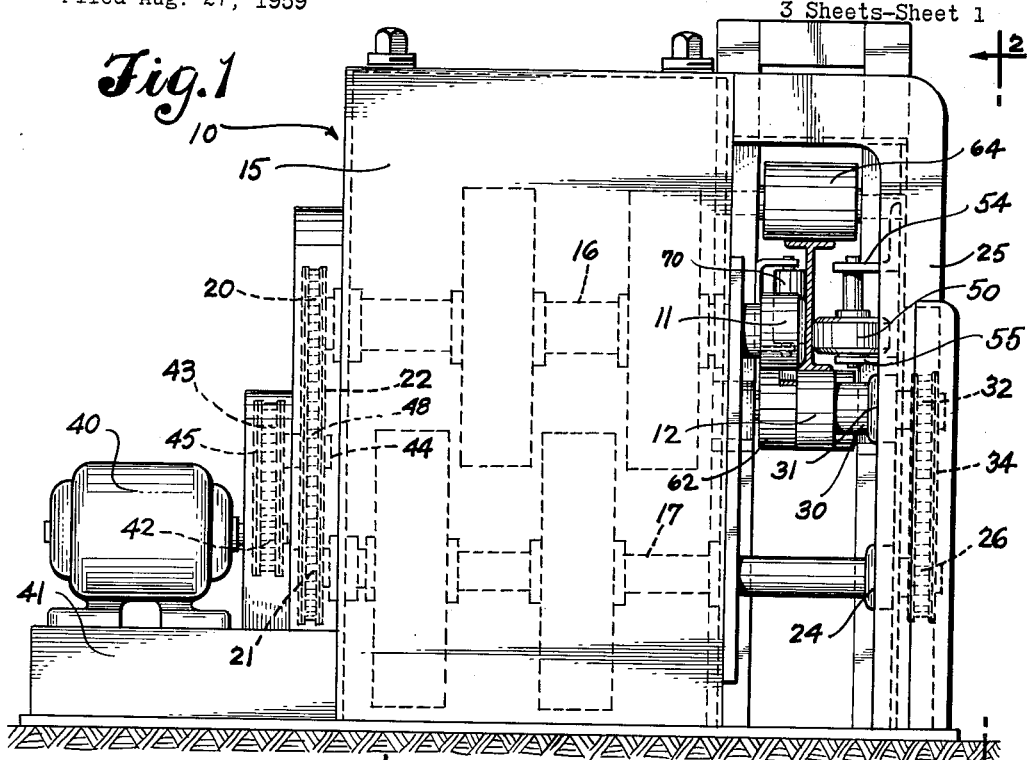
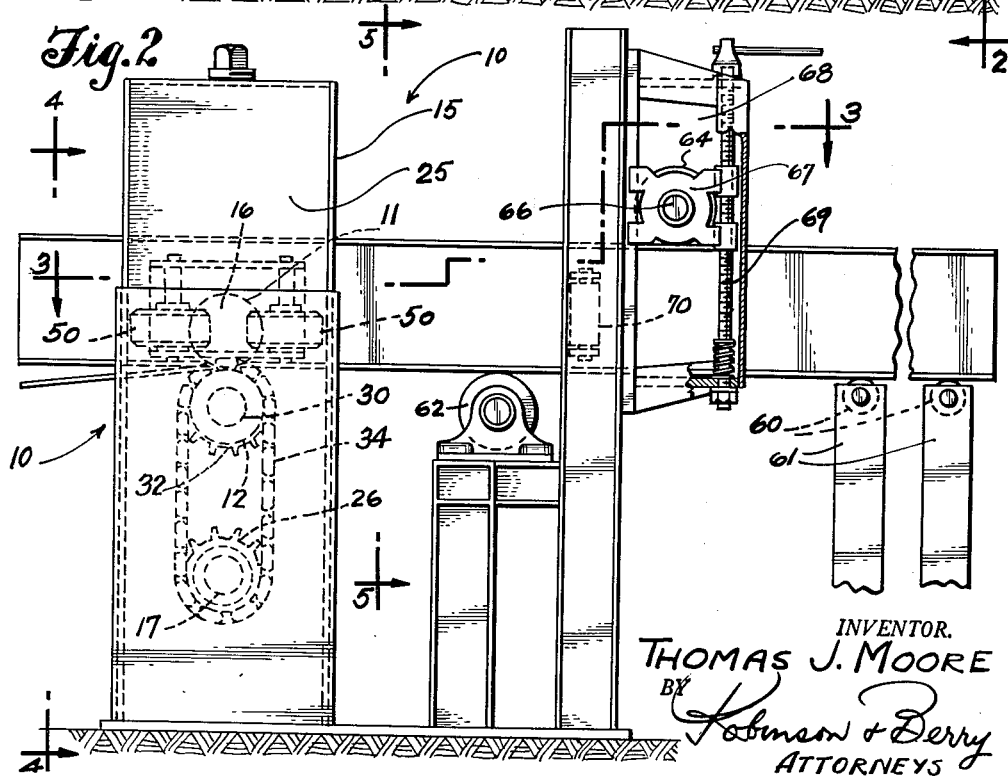
INVENTOR.
THOMAS J. MOORE
BY Robinson & Berry
ATTORNEYS Aug. 21, 1962 T. J. MOORE 3,049,955
MACHINE FOR SHEARING FLANGES FROM I-BEAMS
Filed Aug. 27, 1959 3 Sheets-Sheet 2
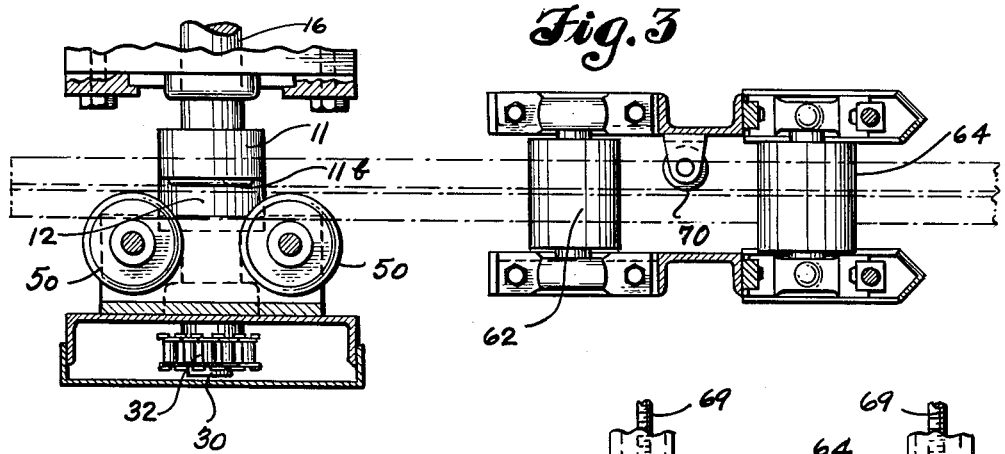
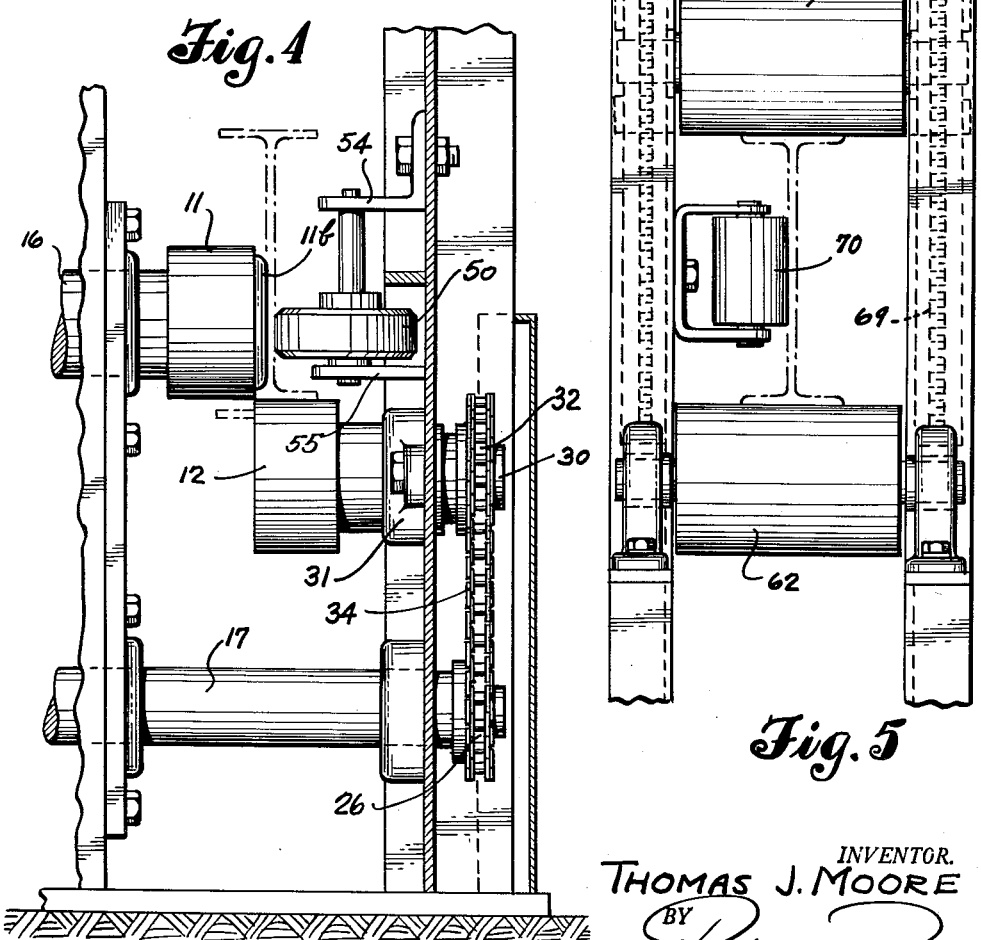
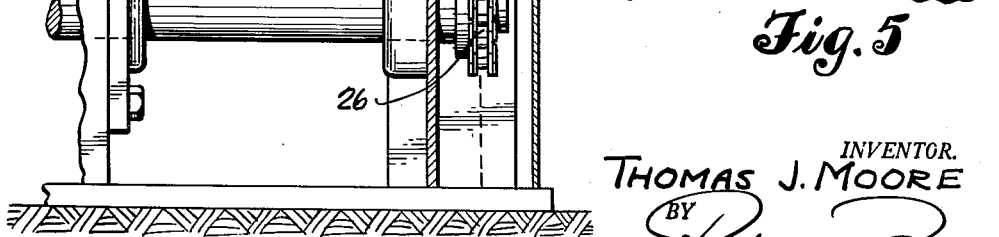
INVENTOR.
THOMAS J. MOORE
BY
Robinson & Berry
ATTORNEYS

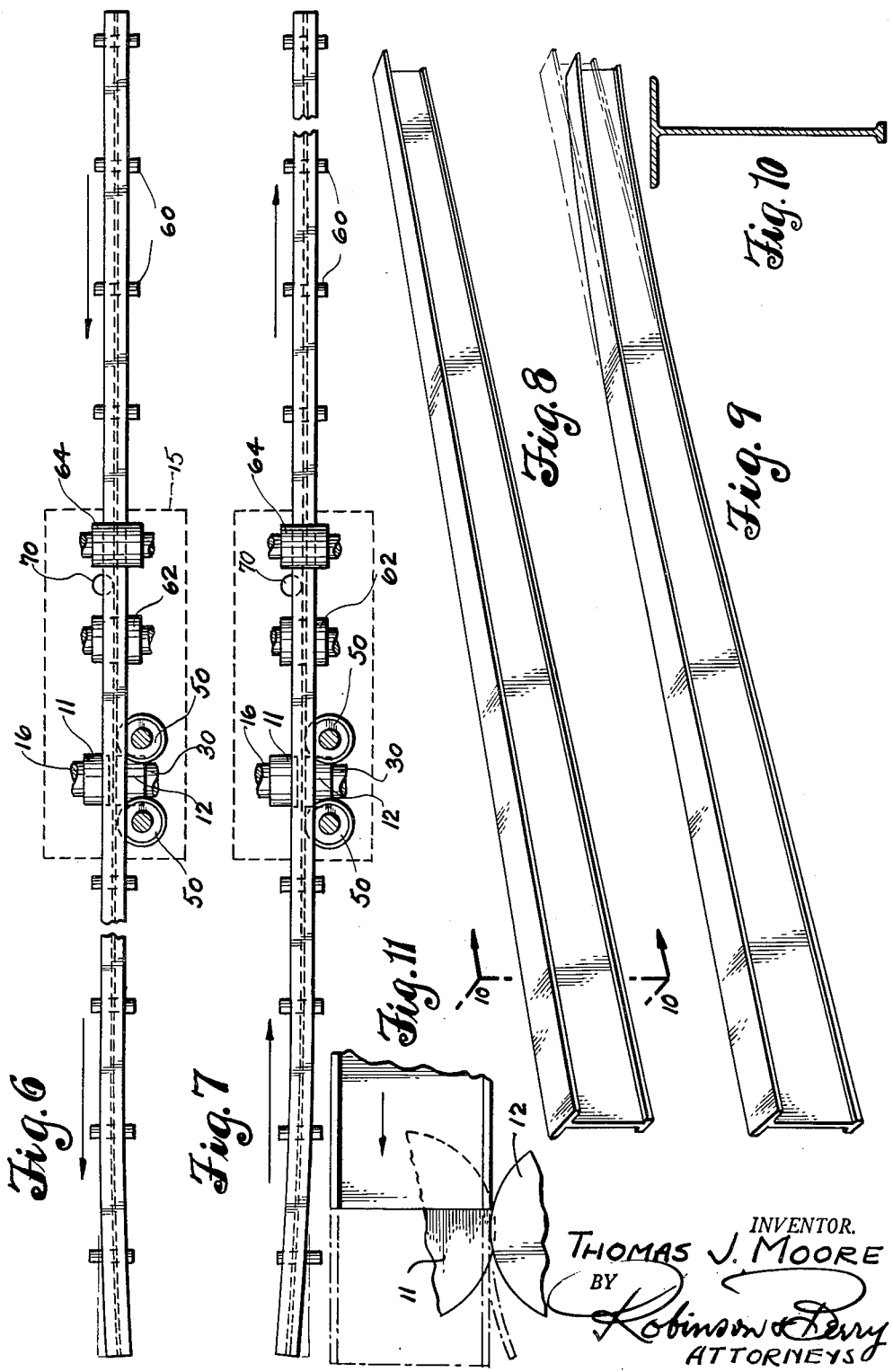

United States Patent Office 3,049,955
Patented Aug. 21, 1962

3,049,955
MACHINE FOR SHEARING FLANGES FROM I-BEAMS
Thomas J. Moore, Seattle, Wash., assignor to Isaacson Iron Works, Seattle, Wash., a corporation of Washington
Filed Aug. 27, 1959, Ser. No. 836,474
2 Claims. (Cl. 83—422)

This invention relates to metal shearing machines and more particularly to a machine that is especially designed to cut flanges from I-beams of the larger dimensions to better adapt the beams for certain uses. For example, large I-beams used in the hull construction of certain kinds of ships, barges, and the like, can be materially reduced in weight, without impairing their utility for certain purposes, by trimming off one or more of their flanges.

Explanatory to this invention, it will here be noted that manufacturers do not, at the present time, produce I-beams other than in standardized dimensions, in respect to webs and flanges and it is therefore necessary that, in the use of these I-beams for some specific jobs, certain flanges must be removed. It is for this flange removing operation, that the present invention has been devised.

It is the principal object of this invention to design a metal shearing machine in which the shearing cut for removal of the I-beam flange, is made by the coaction of two rotatably driven shearing rollers. It is also an object of the invention to provide the machine with certain rollers for guiding the beam in its advancement to the shearing rolls, and to provide for cutting off the flange at one side of the web in travel of the beam in one direction through the machine and for cutting the opposite side flange by passing the beam, after reversing it end for end, through the machine in the opposite direction.

Still further objects and advantages of the invention reside in the details of construction and combination of parts embodied in the machine and in its mode of operation, as will hereinafter be fully described.

In accomplishing the above mentioned and other objects and advantages of the invention, I have provided the improved details of construction, the preferred forms of which are illustrated in the accompanying drawings, wherein, FIG. 1 is an end elevation of a beam shearing machine embodied by the present invention.

FIG. 2 is a back side elevation of the machine, as seen in looking through the plane of line 2—2 in FIG. 1.

FIG. 3 is a fragmental section taken horizontally on line 3—3 in FIG. 2, showing the relationship of the shearing rolls and the beam supporting and guiding rolls.

FIG. 4 is a vertical cross-section, taken on line 4—4 in FIG. 2.

FIG. 5 is a vertical cross-section, taken on line 5—5 in FIG. 2.

FIG. 6 is a horizontal section, showing the I-beam while having a lower edge flange removed, and indicating the incident lateral warping of the beam incident to this cutting operation.

FIG. 7 is a similar view but showing the beam, after being reversed, traveling in the opposite direction for removal of the flange from its opposite side.

FIG. 8 is a perspective view of a straightened I-beam with both side flanges sheared from its lower edge.

FIG. 9 is a similar view of the beam, showing the laterally warped condition of an end portion which has passed the cutting rolls.

FIG. 10 is a cross-section of the beam, taken on line 10—10 in FIG. 8.

FIG. 11 is a view illustrating the lapped relationship of edge portions of the shearing rolls.

Referring more in detail to the drawings: As previously explained, it is the object of this invention to provide a machine designed to be used to economically shear the opposite side flanges from I-beams of substantially large dimensions, that is, from I-beams of standardized dimensions which might be from 8 to 16 inches high and of from 10 to 30 feet in length, and to deliver the trimmed beam from the machine in a substantially straight or unwarped condition.

As shown in FIGS. 1 and 2, the machine designed comprises a frame structure, designated in its entirety by numeral 10, mounting therein a pair of co-acting shearing rolls that are designated, respectively, by numerals 11 and 12; these rolls being mounted in that functional relationship in which they are shown best in FIGS. 1 and 4.

It is shown also, more especially in FIG. 2, that the frame structure 10 comprises a substantial and rigid vertical housing 15 in which two heavy drive shafts, 16 and 17, are mounted horizontally for rotation in the same vertical plane; each shaft having its opposite end portions extended from opposite sides of the housing 15 as illustrated in FIG. 1. The upper shaft 16 mounts the shearing roll 11 at one end thereof and its opposite end is equipped with a driving sprocket wheel 20. The shaft 17 is likewise equipped at one end with a driving sprocket wheel 21 of the same size as sprocket 20 and a sprocket chain belt 22 extends about the two sprocket wheels, 20 and 21, to cause the shafts 16 and 17 to rotate in unison.

Shaft 17, as is best shown in FIG. 1, extends substantially beyond the right hand side of the housing 15 and at that end is rotatably mounted in and supported by a bearing 24 that is fixed in the vertical leg 25 of an arched portion of the frame structure 10 and extends slightly beyond this leg where it is equipped with a sprocket wheel 26. Mounted horizontally in this vertical leg 25 is a stub shaft 30, rotatably supported in a bearing 31. At its inner end this stub shaft is equipped with the shearing roll 12 and at its outer end is equipped with a sprocket wheel 32 that is vertically aligned with the sprocket wheel 26 and a sprocket chain belt 34 operates about these aligned sprocket wheels for the driving of the shearing roll 12 from shaft 17.

At the left hand side of the machine, as shown in FIG. 1 an electric motor 40 for powering the cutting or shearing rolls 11—12 is mounted on a base 41. The motor drive shaft is equipped with a sprocket wheel 42, vertically aligned with a sprocket wheel 43 on a stub shaft 44 that is rotatably mounted in the frame structure 10 and a sprocket chain belt 45 operates about these two sprockets to drive the stub shaft which at its inner end is equipped with another sprocket wheel 48 which is in driving mesh with chain belt 22. Thus, by and through chain belts 22 and 34 both shearing rolls, 11—12, are driven at the same speed but in opposite directions.

It is shown, in FIG. 2, that the shearing roll 11 is axially parallel with roll 12 and located directly above it. The peripheral edges of these rolls are very slightly overlapped, as indicated in FIG. 11, to provide a required shearing relationship. The roll 11 is formed on its end face with a concentric projecting boss 11b, see FIG. 4, that serves a purpose presently explained. When an I-beam is passed into and through the machine, it is supported for horizontal, endwise travel on the top surface of roll 12 as will be understood by reference to FIGS. 1, 2, and 4 with the web of the beam engaged against the projecting part 11b and with its inside lower flange positioned for being sheared off by the coaction of the overlapped edges of rolls 11 and 12. As it moves forwardly, the I-beam is held pressed inwardly against the end surface 11b by a pair of guiding and pressure rollers 50—50 that are mounted in horizontal spacing to revolve on vertical axes which are mounted by upper and lower brackets 54 and 55 fixed to the frame structure, as shown in FIG. 4. The trailing end portion of the advancing beam is supported for travel on small diameter rollers 60 mounted by vertical standards as at 61 in FIG. 2, and at a location relatively close to the shearing rolls the beam is supported by a roller 62 and is held down against this latter roller by a clamping roller 64 that is mounted for rolling contact with the top surface of the advancing beam. This roller 64 has the opposite end portions of its axial shaft 66 mounted in frames 67 as seen in FIG. 2 that are mounted for vertical sliding adjustment in vertical guideways 68 under influence of adjusting shafts 69—69 that have threaded connection with the frames 67. It is also shown in FIGS. 2 and 5 that a vertical guide roller 70 is mounted in the frame structure for rolling contact with the inside face of the web of the I-beam as it is advanced, as has been illustrated in FIG. 5.

The procedure in cutting the opposite side flanges from a beam is to place the beam on the supporting rolls 60 as in FIG. 6 and to advance the forward end portion of the beam endwise into the machine across roll 62 and beneath roll 64. Also, with its web portion engaged at opposite ends by roller 70 and rollers 50—50. The roller 64 is then adjusted downwardly into close holding contact with the top surface of the beam by rotation of the clamp screws 69—69. The motor 40 is then set in motion and the beam is advanced to cause its inside lower flange to engage the coacting shearing rolls 11—12 as indicated in FIG. 11. It is advanced automatically as the shearing takes place. As the cut is formed the beam will be warped slightly away from the cut side as indicated in FIG. 6. When the beam has passed to its full length through the machine, it is then reversed, end for end, and passed through the machine a second time to remove its opposite side flange and in this passage the warped beam will be similarly warped in the opposite direction and will be discharged in a straightened condition as seen in FIG. 8.

In the claims which terminate this specification, the projecting end portion 11b on shearing roll 11 will be designated as a "boss" and the rollers 50—50 will be designated the "beam stabilizing rollers" for easier identification of these parts.

What I claim as new is:

1. A machine for shearing flanges from I-beams immediately adjacent the web, said machine comprising paired, coacting and rotatably driven upper and lower shearing rolls mounted on spaced horizontal axes with the adjacent peripheral edge portions thereof in shearing relationship, means for supporting and guiding an I-beam for endwise advancement to and through the shearing rolls with the flanges on the lower portion of the I-beam in supporting contact with the circumferential surface of the lower roll, an outwardly projecting boss on the end surface of the upper roll slidingly engageable with the adjacent side surface of the web of the advancing I-beam during the flange shearing operation, a pair of spaced stabilizing rollers mounted to engage the opposite side surface of the web of the advancing I-beam and to coact with said projecting boss in holding the advancing beam in fixed relationship relative to said rolls and said stabilizing rollers being positioned at opposite sides of the vertical plane of the axial line of said boss whereby three point pressure is applied to the web to maintain the proper relationship of the I-beam to the shearing rolls.

2. The shearing device of claim 1 including a beam supporting roller located at the entrance side of the machine at the level and spaced from the lower shearing roll, a pressure roller mounted in opposed relationship to said supporting roller above the beam, and the pressure roller being vertically adjustable for bearing in rolling contact with the upper flanges of the beam during the flange shearing operation.

References Cited in the file of this patent

UNITED STATES PATENTS

| 395,569 | Kennedy | Jan. 1, 1889 |
|---|---|---|
| 823,871 | John | June 19, 1906 |
| 1,241,259 | Wurts | Sept. 25, 1917 |
| 1,676,807 | Stevens | July 10, 1928 |
| 1,978,703 | Ehlers | Oct. 30, 1934 |
| 2,208,022 | Dworchuck et al. | July 16, 1940 |
| 2,352,816 | Weightman | July 4, 1944 |
| 2,370,993 | Rathgen | Mar. 6, 1945 |
| 2,876,836 | Rau | Mar. 10, 1959 |

FOREIGN PATENTS

| 23,497 | Germany | Sept. 15, 1883 |